US012301579B1

United States Patent
Sirotin et al.

(10) Patent No.: US 12,301,579 B1
(45) Date of Patent: May 13, 2025

(54) USING A PRIMARY ACCOUNT TO IMPLEMENT A RESOURCE MANAGEMENT PLAN ACROSS ACCOUNTS OF AN ORGANIZATION

(71) Applicant: Amazon Technologies, Inc., Seattle, WA (US)

(72) Inventors: Alexander Sirotin, North Vancouver (CA); Zhicong Wang, Seattle, WA (US); Wayne William Duso, Charlestown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 606 days.

(21) Appl. No.: 16/908,428

(22) Filed: Jun. 22, 2020

(51) Int. Cl.
*H04L 9/40* (2022.01)

(52) U.S. Cl.
CPC .......... *H04L 63/102* (2013.01); *H04L 63/104* (2013.01); *H04L 63/105* (2013.01)

(58) Field of Classification Search
CPC ... H04L 63/102; H04L 63/104; H04L 63/105; G06F 11/1446; G06F 11/1448; G06F 11/1451; G06F 11/1461; G06F 11/1464; G06F 2221/0782; G06F 11/1458
See application file for complete search history.

(56) References Cited

U.S. PATENT DOCUMENTS

| | | | | |
|---|---|---|---|---|
| 8,630,983 B2* | 1/2014 | Sengupta | ............ | G06F 11/2094 707/654 |
| 8,676,622 B1* | 3/2014 | Ward, Jr. | ......... | G06Q 10/06313 705/7.11 |
| 8,886,551 B2 | 11/2014 | Offenberg | | |
| 9,477,530 B2* | 10/2016 | Nachtrab | ............ | G06F 11/1464 |
| 10,003,646 B1* | 6/2018 | Edwards | ............. | G06F 11/1458 713/165 |
| 10,489,807 B1* | 11/2019 | Arguelles | ............ | G06F 11/1451 |
| 11,269,540 B2* | 3/2022 | Zhou | .................. | H04L 67/1097 709/222 |

(Continued)

OTHER PUBLICATIONS

Chervenak, Ann, Vivekenand Vellanki, and Zachary Kurmas. "Protecting file systems: A survey of backup techniques." Joint NASA and IEEE Mass Storage Conference. vol. 99. 1998. (Year: 1998).*

(Continued)

*Primary Examiner* — Jung W Kim
*Assistant Examiner* — Sameera Wickramasuriya
(74) *Attorney, Agent, or Firm* — Robert C. Kowert; Kowert, Hood, Munyon, Rankin & Goetzel, P.C.

(57) ABSTRACT

A cross-account data management (CAM) service of a provider network may assign, to a primary account of an organization of a client, permission to manage resource management plans for other accounts of the organization. The CAM service may specify, using the primary account (e.g., by an administrator using the primary account), a resource management plan (e.g., data backup plan) The CAM service may indicate, using the primary account, multiple accounts of the organization that the resource management plan is to be implemented for. The CAM service may cause, based on the permission assigned to the primary account, the resource management plan to be implemented for the different accounts of the organization (e.g., by causing execution of jobs to implement a backup plan).

20 Claims, 11 Drawing Sheets

(56) References Cited

U.S. PATENT DOCUMENTS

| | | | |
|---|---|---|---|
| 2002/0156904 A1* | 10/2002 | Gullotta | G06Q 10/06 709/229 |
| 2003/0018510 A1 | 1/2003 | Sanches | |
| 2003/0018657 A1* | 1/2003 | Monday | G06F 11/1464 |
| 2003/0079132 A1* | 4/2003 | Bryant | G06F 8/60 717/176 |
| 2004/0204949 A1* | 10/2004 | Shaji | G06F 11/1469 714/E11.122 |
| 2004/0260973 A1* | 12/2004 | Michelman | G06F 11/1464 714/13 |
| 2005/0021950 A1* | 1/2005 | Rothbarth | G06F 11/1458 713/165 |
| 2005/0071390 A1* | 3/2005 | Midgley | G06F 11/1451 |
| 2007/0198789 A1* | 8/2007 | Clark | G06F 11/1469 714/E11.122 |
| 2007/0208806 A1* | 9/2007 | Mordecai | G06Q 10/10 709/204 |
| 2008/0022058 A1* | 1/2008 | Nadathur | G06F 11/1461 711/162 |
| 2009/0254593 A1* | 10/2009 | Halim | G06F 11/1461 715/744 |
| 2011/0161297 A1* | 6/2011 | Parab | G06F 11/2094 707/646 |
| 2011/0197254 A1* | 8/2011 | Sallaka | G06F 21/6218 726/1 |
| 2011/0306326 A1* | 12/2011 | Reed | H04L 67/04 455/414.1 |
| 2014/0025796 A1* | 1/2014 | Vibhor | H04L 67/1097 709/222 |
| 2016/0057150 A1* | 2/2016 | Choi | H04L 63/104 726/1 |
| 2016/0266981 A1* | 9/2016 | Fiducci | H04L 63/101 |
| 2018/0060180 A1* | 3/2018 | Tan | G06F 11/1461 711/162 |
| 2018/0150650 A1* | 5/2018 | Saunders | G06F 11/1461 715/744 |
| 2020/0159624 A1* | 5/2020 | Malkov | H04L 63/101 |
| 2021/0271564 A1* | 9/2021 | Mitkar | G06F 11/1469 714/E11.122 |

OTHER PUBLICATIONS

Ngô, Bá Hùng, and Công Trứ Huỳnh. "Enterprise Application Backup and Restore in Cloud Computing." (2016). (Year: 2016).*

Shams, Khawaja. "Planning as a Service: A Plan Repository Model Inspired by Cloud Computing." SpaceOps 2012. 2012. 1297513. (Year: 2012).*

* cited by examiner

| Account Name | Job ID | Job Status | Backup Plan Name | Resource Type | Job Creation Time |
|---|---|---|---|---|---|
| Account A | 713 | Complete | Daily Backup | Analytics Service | July 4, 2021 at UTC 07:00 |
| Account B | 77 | In Progress | Weekly Backup | Relational Database Service | July 7, 2021 at UTC 07:00 |
| Account C | 256 | Complete | Daily Backup | Compute Service | July 5, 2021 at UTC 9:30 |
| Account X | 948 | Failed | Daily Backup | Relational Database Service | July 4, 2021 at UTC 09:00 |
| Account Y | 101 | Complete | Weekly Backup | Key-Value Data Storage Service | July 7, 2021 at UTC 09:00 |

CAM Service
Job Status for Organization XYZ
602

FIG 6

USING A PRIMARY ACCOUNT TO IMPLEMENT A RESOURCE MANAGEMENT PLAN ACROSS ACCOUNTS OF AN ORGANIZATION

BACKGROUND

Many businesses and other types of organizations rely on digital storage of data and may create backup copies of the data at different points in time in order to protect the data. In many cases, an organization may use a remote service provider network to run various computing applications and backup the data produced or stored by those applications. For example, a business may create a client account with a service provider network in order to use a data analytics service or a database service of the provider network. Data that is produced by the data analytics service or data that is stored by the database service may be backed up at the provider network (e.g., using a storage service).

In many cases, a client of a provider network may have many different accounts with the provider network. For example, a large business organization may have different accounts with a provider network that were created for different business groups within the business (e.g., human resources, finance, engineering, etc.). Often, clients with many accounts manage data backup policies and data compliance for each account independently (e.g., by different people in different groups or even different people within the same group). This may expose the client to potential compliance violations, such as incorrect retention windows for sensitive workloads. It may also make it difficult to create a single view of the client's data backups that are implemented across the organization. Clients may also spend a significant amount of time configuring backup plans in each account, taking administrators away from more business-critical tasks.

BRIEF DESCRIPTION OF THE DRAWINGS

FIG. 6 is an illustration of a displayed status of data protection jobs for different accounts of an organization, according to some embodiments.

Figure 1:
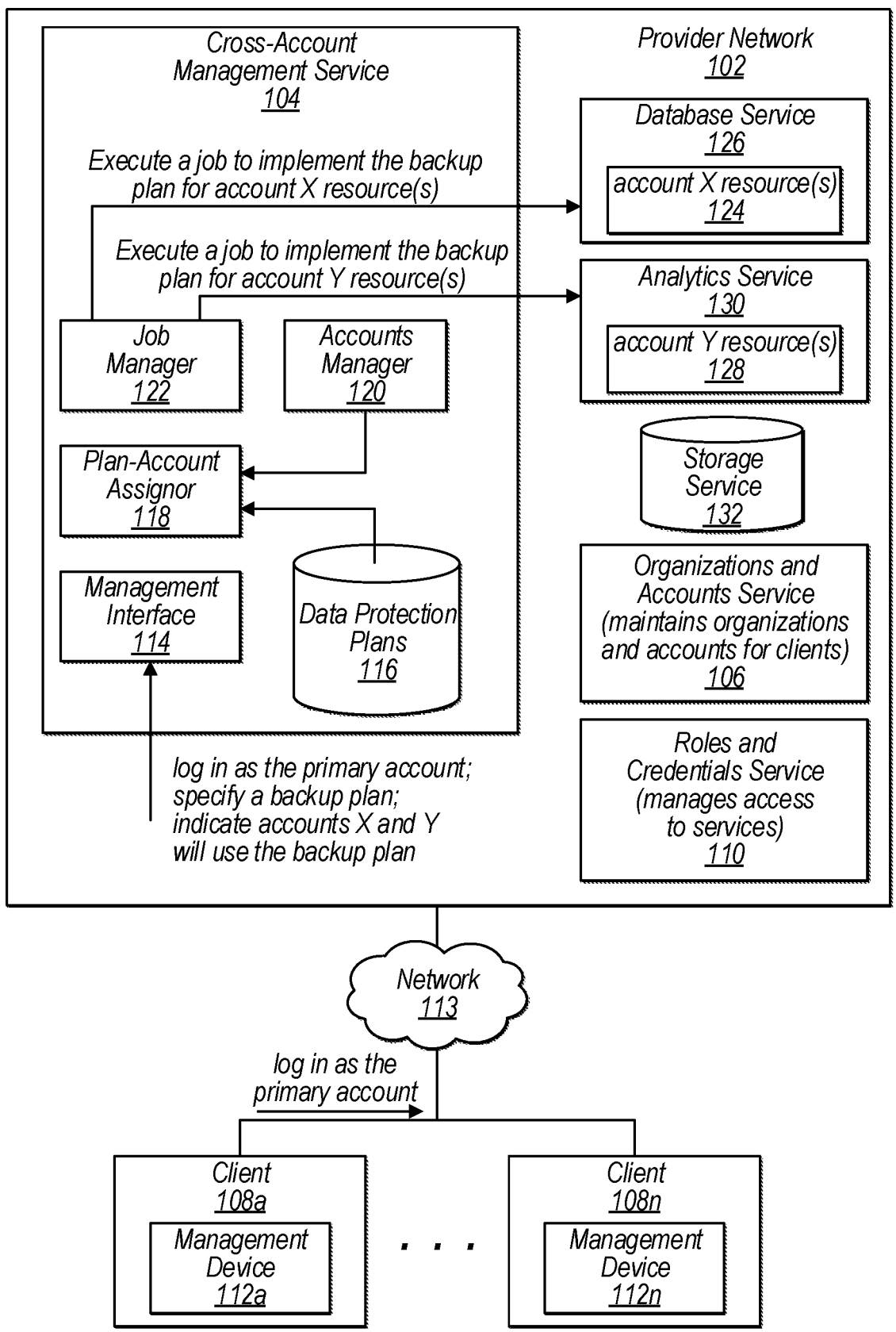
FIG. 1 is a logical block diagram illustrating a system for using a primary account to implement a data protection plan across accounts of an organization, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to use a primary account to implement a resource management plan (e.g., data protection plan/backup plan) across accounts of an organization, according to some embodiments. For example, a client may enable a single primary account to manage any number of data protection plans across multiple accounts of an organization to reduce the time required to implement the data protection plans compared to traditional techniques for managing accounts on an individual basis. As used herein, in some embodiments, "data protection plan" and "backup plan" may be used interchangeably, and "plan" and "policy" may be used interchangeably.

Although a "data protection plan" or "backup plan" is used herein as examples of a resource management plan, it is appreciated that any other type of resource management plan may be implemented using the same techniques or similar techniques as described herein. For example, any number or type of operations associated with or affecting one or more resources of account(s) may be performed as a part of a resource management plan (e.g., operations to create new resources such as a new table using a database service, operations to configure a service/resource such as applying configuration parameters to database instances, operations to grant or remove access permission to resources for different users/applications, and/or any other operations to manage data for one or more resources of the account).

As used herein, in embodiments, reference to a data protection plan, backup plan, or other types of plans may be considered to refer to a "resource management plan." Therefore, a data protection plan, backup plan, or other type of plan described herein may, in embodiments, be any type of resource management plan (e.g., implemented by a primary account across multiple accounts to perform one or more operations for resources of each of the accounts).

In embodiments, a given client of the provider network (e.g., an organization or other entity) may create (e.g., set up, establish, etc.) any number of accounts at provider network in order to allow the client to use one or more services (e.g., database services, compute/analytics services) provided by the provider network. In some embodiments, to allow use of a service, a given account of the client enables permissions-based access to one or more resources of the account at the provider network (e.g., certain database tables of a database service, a set of compute instances of a compute service). Another account of the client may enable permissions-based access to one or more of the resources of the other account at the provider network (e.g., the same tables/instances and/or different tables/instances). In embodiments, any number of accounts may be created that each enable permissions-based access to any corresponding number of resources at the provider network.

To enable permissions-based access to one or more resources of an account, a user or role may be assigned to an account. In embodiments, certain permissions may be assigned to the user or the role that authorize (or deny) the user or the role access to one or more resources of the account. When a person (or application/service) logs in to the account as the user, the user will be allowed or denied access to different resources of the account, based on the permissions assigned to the user. For example, assigned permissions may allow the user to access a "company travel expenses" table of a database service, but deny the user access to an "employee health plans" table of the database service. Similarly, if an application of the provider network (e.g., a "backup service") assumes a role for an account, the application will be allowed or denied access to different resources of the account, based on the permissions assigned to the role. In some embodiments, the accounts of a client may be logically associated with each other at the provider network as an organization (e.g., organized in a hierarchical tree structure).

In embodiments, a given client may deploy an organization-wide backup plan to ensure compliance across all accounts (or a certain number of accounts) in their organization. This enables the client to standardize the way they implement backup policies, minimizing manual errors and effort simultaneously. In embodiments, cross-account data management (CAM) may facilitate greater transparency with respect to meeting data protection regulations, compared to traditional techniques. With a central view, customers may easily identify resources or accounts that have fallen out of compliance with respect to data protection regulations.

In some embodiments, clients who have set up an organization for their accounts may configure a CAM service from their primary account to monitor all (or some) of the accounts in their organization. This may be done from a console (e.g., graphical user interface (GUI) or command line interface). Clients may also create a backup plan and apply it to multiple selected accounts that are a part of their organization. In embodiments, clients may view the aggregate backup jobs activity directly from the console. This functionality enables backup administrators to effectively monitor backup job status and compliance of any number of accounts (e.g., hundreds or more) across their entire enterprise from a single primary account.

In embodiments, clients may automatically apply backup policies (in the form of a backup plan) across multiple accounts, making compliance and data protection efficient at any scale. The ability to automatically apply a backup plan across multiple accounts reduces operational overhead compared to manually duplicating backup policies across individual accounts.

A backup plan may consist of a set of rules that determine how clients want to protect their workloads (e.g., recovery point objective (RPO), resource selection, expiration, etc.). In some embodiments, a "regular" backup plan may refer to a backup plan that applies within the boundaries of a single account, whereas a "global" backup plan may refer to a backup plan that is applied to multiple accounts.

In embodiments, a "group" or "organizational unit" or "unit" may be a group of accounts that can be managed as a single entity. As described herein, a group may be a layer of hierarchy that organizes accounts within the hierarchy. In some embodiments, it may be convenient to use a group in order to apply a data protection plan to multiple accounts in a particular area or logical boundary of an organization. In embodiments, a backup plan can be applied from the primary account to other selected member accounts and groups (organization units) in parallel.

In some embodiments, when users create or edit a backup plan in their primary account, the role provided as part of the backup selection must be able to assume role permissions for each of the roles in the target accounts. In embodiments, the roles in target accounts must have the same name as the role in the primary account. When the CAM service executes the backup plan, it first assumes the provided role in the primary account. Then, using the primary account credentials, the CAM service assumes the role in each target account. For example, if the backup plan in the primary account contains a backup selection with the role "name:x:y::1111:role/CompanyBackupRole" and is applied to account 2222, the CAM service will assume the role "name:x:y::1111:role/CompanyBackupRole" when executing the backup plan. Similarly, the CAM service will also assume the role "name:x:y::2222:role/CompanyBackupRole" to perform all the required backup operations in account 2222.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 9 and described below.

This specification begins with a description of a system for using a primary account to implement a data protection plan across accounts of an organization. A number of different methods and techniques to use a primary account to implement a data protection plan across accounts of an organization are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for using a primary account to implement a data protection plan across accounts of an organization, according to some embodiments.

In the depicted embodiment, a provider network 102 includes a cross-account data management (CAM) service 104 that implements a data protection plan across accounts of an organization. The provider network 102 also includes an organizations and accounts service 106 that maintains organizations and accounts for different clients 108 of the provider network/CAM service. The provider network 102 also includes a user/role and credentials service 110 that manages users and roles that may be assigned to accounts to enable permissions-based access to one or more resources of the accounts.

In embodiments, the user/role and credentials service 110 also provides authentication (e.g., verifying identity) for users and roles based on credentials provided by the client (e.g., user credentials provided by an operator/administrator) or based on credentials provided by an application/service (e.g., role credentials). In embodiments, after authentication, the CAM service provides or denies access to resources of the account, as described herein.

As shown, the different clients 108 may use a management device 112 remotely located from the provider network 102 (e.g., in a local (private) network of the client separate from a local network of the provider network). Devices within a given client may communicate with the provider network (or other networks) via a wide-area network 113 (e.g., the Internet). Different management device 112 may be controlled and/or owned by different clients of the CAM service 104 and/or provider network. In embodiments, each client network may include any number of additional devices.

In the depicted embodiment, a management device 112 may be used to communicate with a management interface 114 (e.g., via a graphical user interface and/or command line interface of the management device 112) of the CAM service 104. As shown, the client (e.g., an administrator of the client) may log in at the CAM service as a user of the primary account of the organization of the client (e.g., in response to verifying, by the CAM service, credentials that are provided by the administrator).

After logging in, the administrator may specify, using the primary account, a data protection plan. For example, the administrator may select a plan from among a list of different data protection plans 116 that a plan-account assignor 118 of the CAM service 104 obtains from a data store. The administrator may also indicate, using the primary account, multiple accounts of the organization that the data protection plan is to be implemented for. For example, the plan-account assignor 118 may obtain a list accounts of the organization from an accounts manager 120 and the administrator may display the accounts available for selection/indication (e.g., as a list or as a hierarchical tree structure). In embodiments, the accounts manager 120 may obtain an updated list of accounts of the organization from the organizations and accounts service 106 (e.g., in response to an event or according to a refresh schedule).

In response receiving the indication of the accounts of the organization that the data protection plan is to be implemented for (e.g., accounts X and Y), the CAM service may cause, based on the permission assigned to the primary account, the data protection plan to be implemented for account X and account Y. Note that in various embodiments, any number of accounts may be indicated as accounts that the data protection plan is to be implemented for. As shown, in embodiments the CAM service may cause, based on the permission assigned to the primary account, execution of jobs to implement the data protection plan for account X and account Y. Although the current example shows only two accounts being indicated to execute the backup plan, in various embodiments any number of accounts may be indicated to execute the backup plan (and to perform any other functionality as described herein).

In some embodiments, the job manager may execute the jobs necessary to implement the data protection plan for the plurality of accounts (e.g., immediately in response to indication of the accounts or later according to a schedule). As shown, the CAM service executes a job to implement the backup plan for account X (e.g., to back up resources of account X). As depicted, the backup plan for account X backs up data for any number of account X resources 124 (e.g., tables, instances, etc.) of the database service 126.

In embodiments, a given data protection plan implemented for a given account performs one or more operations to protect data (e.g., operations that backup the data to a data store at the provider network) for resources of the account. In some embodiments, a given data protection plan causing the backup operations to be implemented for each of the accounts according to a predetermined frequency (e.g., daily, weekly, etc.) and/or according to a backup lifecycle. For example the backup lifecycle may specify at what point in time a backup of data is transitioned from one type of storage/storage device to another and/or at what time the backup expires. For example, 30 days after a backup of data is initially created at the provider network, the backup may be removed from its current storage location and stored at another storage location (e.g., other storage devices or at another storage service that may be referred to as "cold" storage to store unused data or rarely accessed data). In embodiments, the CAM service may apply (or modify or remove), via the primary account, any number of backup plans to any number of accounts.

In some embodiments, in order to provide additional reliability and scalability, data centers that store data used by an organization's accounts may be located in different physical locations/geographic areas. For example, one region used by the account may include data centers located in a western half of a country, while another region used by the account may include data centers located in an eastern half. In embodiments, availability zones may be distinct locations within a region that are engineered to be isolated from failures in other availability zones. An availability zone may provide low-latency network connectivity to another availability zone in the same region. In some embodiments, a backup lifecycle for one or more accounts may specify that backups of data are copied from one region used by the account (or availability zone of the account) to another region used by the account (or another availability zone of the account within the same region) at certain times (e.g., 30 days after a backup of data is initially created).

As shown, the CAM service also executes a job to implement the backup plan for account Y (e.g., to back up resources of account Y). As depicted, the backup plan for account X backs up data for any number of account Y resources 124 (e.g., tables, instances, etc.) of the database service 126. In some embodiments, data for a given resource may or may not be backed up, depending on one or more additional criteria/factors. For example, a given resource may be tagged/associated with metadata that indicates whether or not the resource will be backed up. If the metadata indicates backups are allowed (e.g., backup="yes"), then the data for the resource will be backed up. If the metadata indicates backups are not allowed (e.g., backup="no"), then the data for the resource will not be backed up.

Also depicted is a storage service 132 that may be used to store the data being backed up. In various embodiments, any number of backup copies may be made to back up data for a given resource to any number of data stores (or to the same data store) of the provider network (e.g., according to the specified backup plan).

Figure 2:
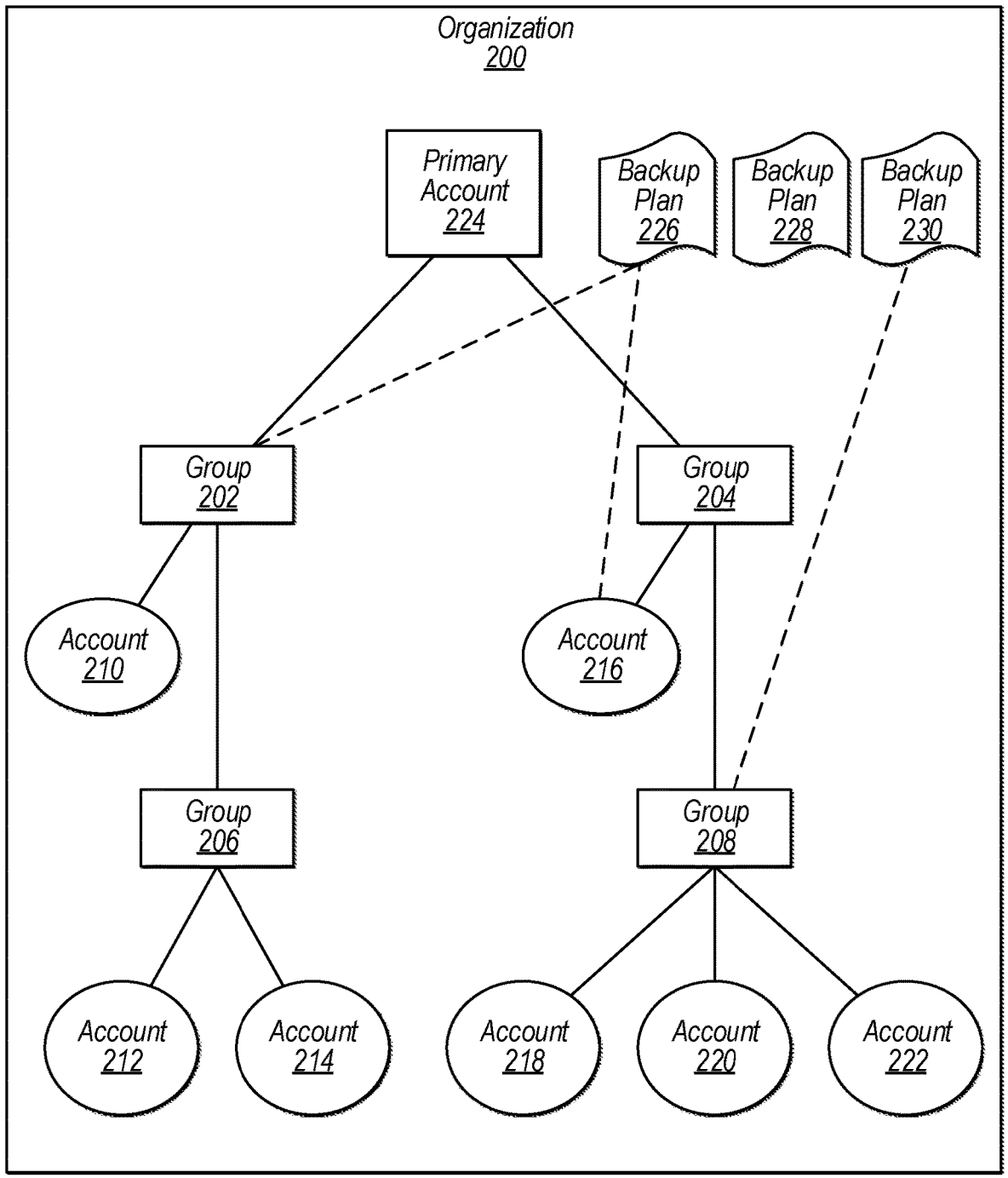
FIG. 2 is a logical block diagram illustrating a data protection plan that is implemented for multiple accounts of a client organization, according to some embodiments.

FIG. 2 is a logical block diagram illustrating a data protection plan that is implemented for multiple accounts of a client organization, according to some embodiments.

As shown, the organization 200 for a client may include groups 202, 204, 206, 208 (e.g. organizational units). Group 202 includes account 210, group 206 includes accounts 212, 214, group 204 includes account 216, and group 208 includes accounts 218, 220, 222. Also shown is a primary account 224 that may have authorization/permission to manage any of the accounts or groups of the organization (e.g., "super user" access) and each of the accounts may have a lower level of access (e.g., an administrator for another account may only have authorization/permission to manage backup plans for that account). In some embodiments, to set up/configure the organization (e.g., using the organizations and accounts service 106), a client may first set up the primary account for the organization, and then set up the groups and accounts.

In the depicted embodiment, the primary account 224 (e.g., via input from an administrator with user access to the primary account) has indicated group 202 and account 216 to use the backup plan 226 and has caused, based on the permission assigned to the primary account, execution of jobs to implement the backup plan 226 for account 210 and 216 (e.g., the primary account has "applied" the backup plan 226 to those account 216 to use the backup plan 230 and has caused, based on the permission assigned to the primary account, execution of jobs to implement the backup plan 230 for account 218, 220, 222.

As shown, backup plan 228 is not currently applied to any account of the organization, but is available to be applied (e.g., it may be stored in data protection plans 116). In embodiments, an administrator with user access to the primary account may define/add any number of data protection plans, as well as modify/delete any number. In embodiments, the CAM service may provide any number of default execution plans that are available for application.

In some embodiments, when an account joins a group as a new member of the group, then the CAM service may cause (based on the permission assigned to the primary account) execution of jobs to implement the group's data protection plan for the new account (e.g., the protection plan currently implemented for the group by the primary account). For example, the CAM service may determine that a new account has joined the group and in response, implement the same data protection plan for the new account. In some embodiments, the CAM service may determine that an account of a group is no longer a member of the group (e.g., due to leaving the group and/or joining a different group) and in response, remove the data protection plan from being applied to that group (based on the permission assigned to the primary account) so that the CAM service no longer implements the data protection plan to that account.

Figure 3:
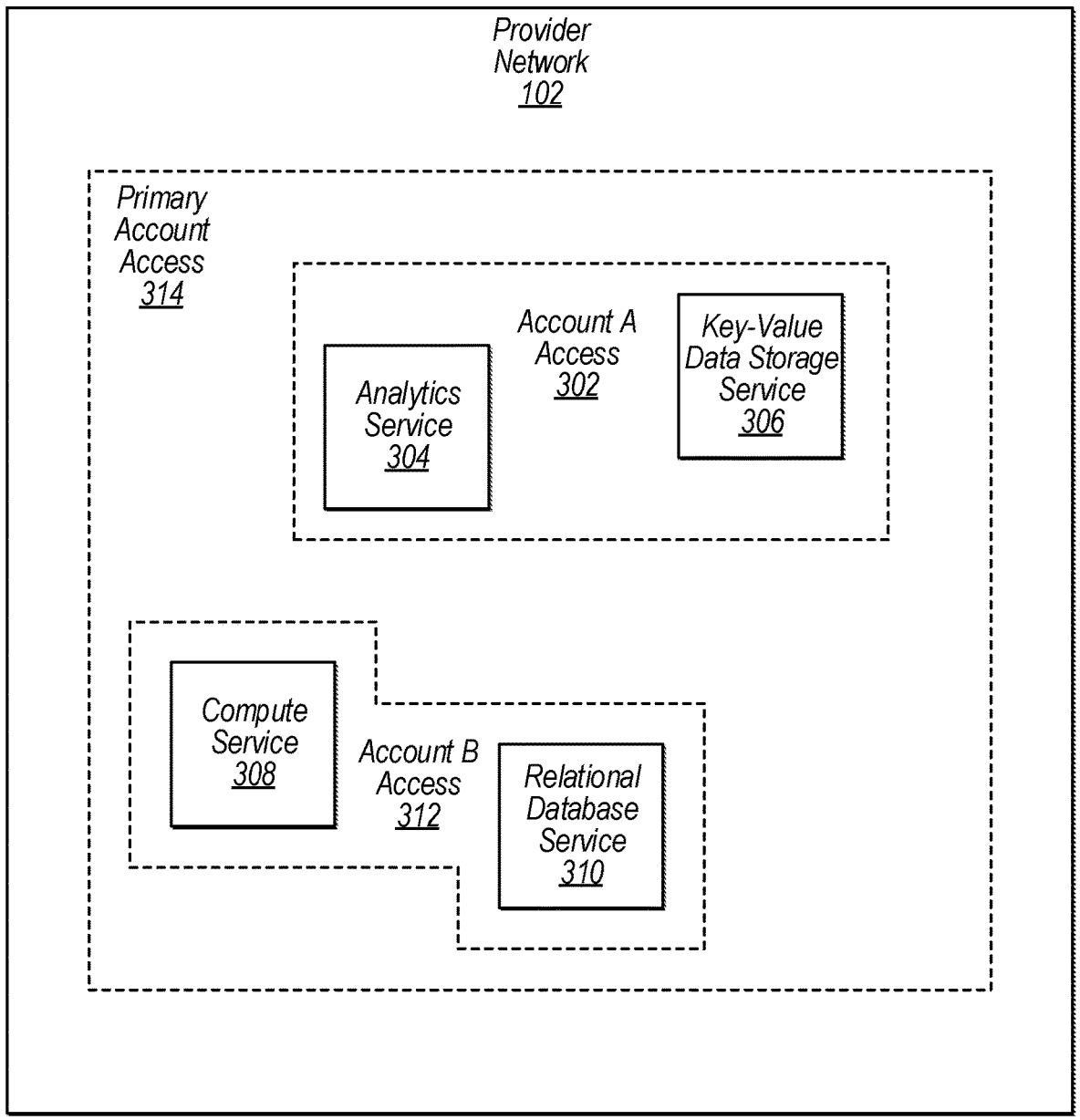
FIG. 3 is a logical block diagram illustrating resources at a provider network that are accessible to different accounts of a client organization, according to some embodiments.

FIG. 3 is a logical block diagram illustrating resources at a provider network that are accessible to different accounts of a client organization, according to some embodiments.

In the depicted embodiment, account A has access 302 to resources of the analytics service 304 (e.g., a specialized type of compute service) and the key-value data storage service 306. In embodiments, account A (e.g., a user/role using account A) may apply (or monitor/view) any number of backup plans for account A (e.g., to back up data for the analytics service such as analytics instances, analysis results, etc. and/or to back up data for the key-value data storage service such as tables, other data, etc.). However, account A may not have access to resources of the compute service 308 or the relational database service 310.

In embodiments, account A may not apply (or monitor/view) any backup plans/jobs for account B because account A (and any user/roles on account A) does not have permission to manage resources of account B (although if account A also has access to the relational database service, then it may manage its own resources (e.g., tables) in that service). In embodiments, the identifiers (names) of other data protection plans that are applied to any other accounts (e.g., account B) are inaccessible to the account A. Similarly, the status of other jobs of other accounts (e.g., account B) is inaccessible to account A.

Similarly, account B has access 312 to resources of the compute service 308 and the relational database storage service 310. In embodiments, account B (e.g., a user/role using account B) may apply (or monitor/view) any number of backup plans for account B (e.g., to back up data for the compute service such as compute instances, compute results, etc. and/or to back up data for the relational database storage service such as tables, other data, etc.). However, account B may not have access to resources of the analytics service or the key-value data storage service. Furthermore, account B may not apply (or monitor/view) any backup plans/jobs for account A because account B (and any user/roles on account B) does not have permission to manage resources of account A (although if account B also has access to the analytics service or the key-value data storage service, then it may manage its own resources (e.g., tables) in those services).

In embodiments, a local account administrator using a particular account may be unable to make changes to the data protection plan that has been implemented by the primary account for the particular account. Therefore, the local administrator may be unable to change or otherwise override any part of the data protection plan applied to the account by the primary account. In embodiments, other accounts may be inaccessible to the local administrator. For example, the local administrator may be unable to obtain any information regarding the other accounts and therefore may be unaware of the existence of other accounts and/or any data protection plans implemented on other accounts.

As shown, a primary account of an organization that includes account A and account B may have access 314 to all of the resources that account A and account B have access to (e.g., the primary account may have super user access that allows it to access any of the services/resources of the other member accounts of the organization). Therefore, the primary account may apply (or monitor/view) any number of backup plans for accounts A and B (and any other member accounts/groups of the organization).

Figure 4:
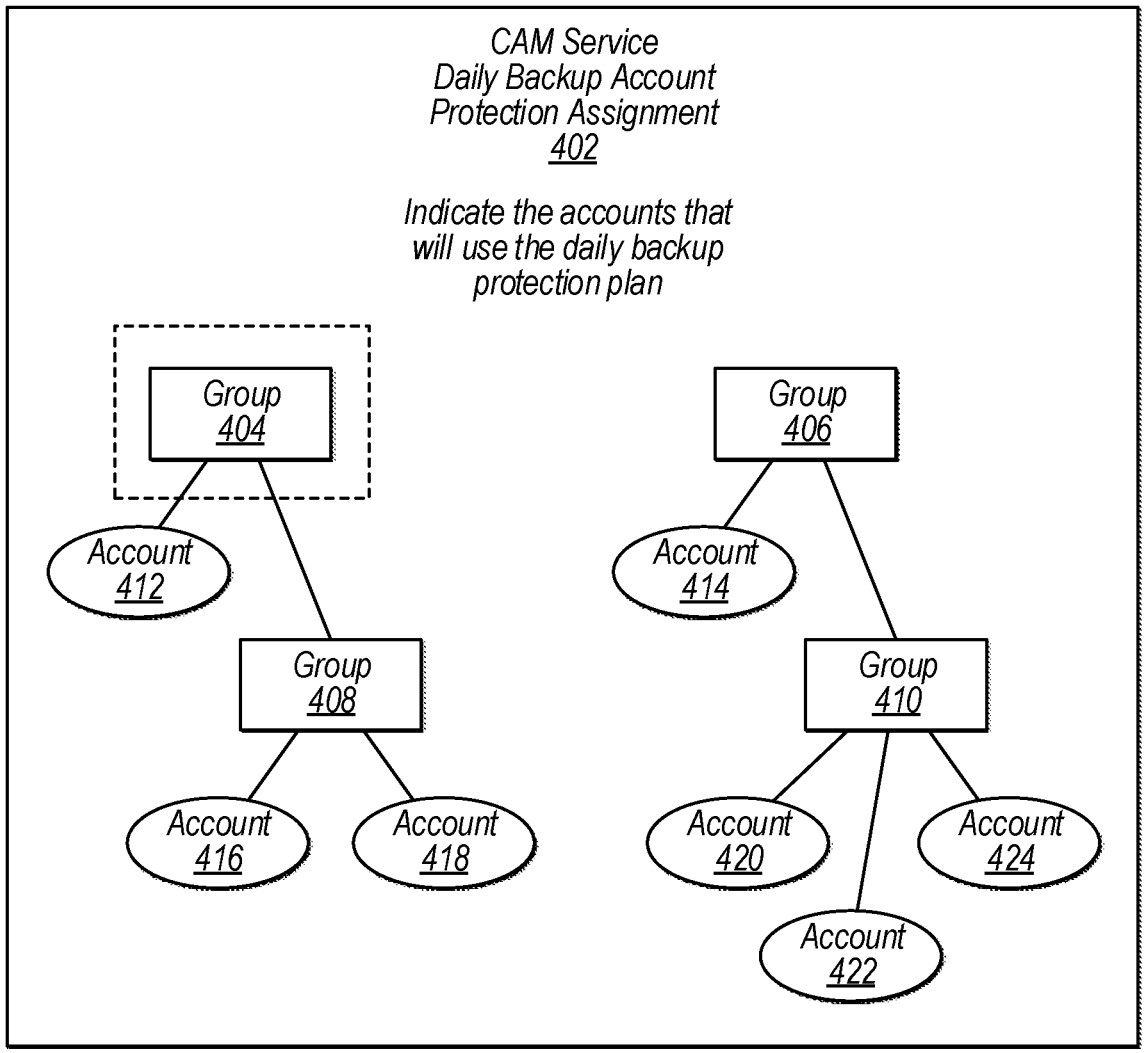
FIG. 4 is an illustration of user interface that allows a user to indicate, using a primary account, multiple accounts of a client organization that a particular data protection plan is to be implemented for, according to some embodiments.

FIG. 4 is an illustration of user interface that allows a user to indicate, using a primary account, multiple accounts of a client organization that a particular data protection plan is to be implemented for, according to some embodiments.

In the depicted embodiment, the GUI 402 may be displayed by the CAM service to a user/administrator of a client (e.g., on a management device 112). As shown, the GUI displays groups and accounts of an organization (groups 404, 406, 408, 410 and accounts 412, 414, 416, 418, 420, 422, 424) and allows the administrator to indicate accounts that a data protection plan is to be implemented for (e.g., the "daily backup plan").

As shown, the administrator may indicate group 404. By indicating group 404, the administrator indicates account 412, 416, 418 are to implement the daily backup plan. This may provide a convenient way for a user to indicate many different accounts by indicating/selecting one group. In embodiments, any backup plans that were previously applied to a group or account may be overridden/removed when a new backup plan is applied to them. For example, if the group 408 (and therefore accounts 416, 418) had a weekly backup plan applied to them, then that plan will be removed and the new daily backup plan is applied to them. In embodiments, a local account administrator (e.g., for account 416) may apply any number of their own local backup plans as well. In embodiments, a given account may have a backup plan applied/executed by a primary account (e.g., a primary or global backup plan) while having any number of local backup plans concurrently applied/executing.

Figure 5:
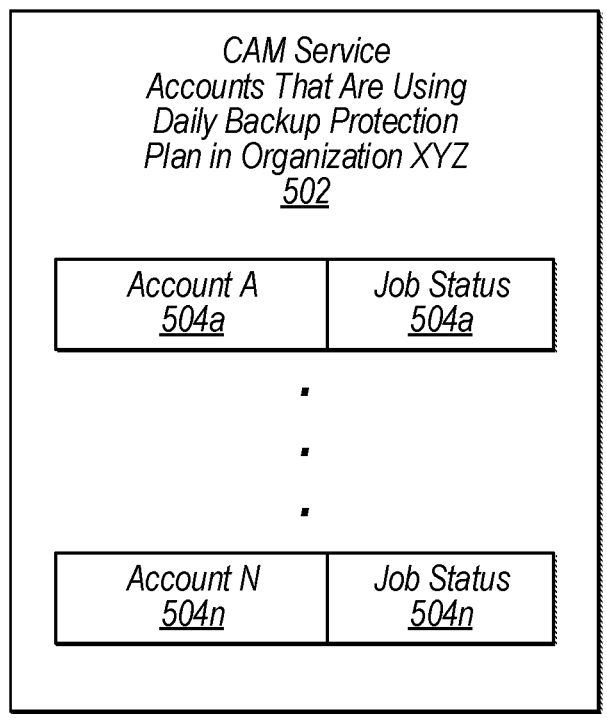
FIG. 5 is an illustration of a displayed list of different accounts that a particular data protection plan is applied to, according to some embodiments.

FIG. 5 is an illustration of a displayed list of different accounts that a particular data protection plan is applied to, according to some embodiments.

In the depicted embodiment, a user/admin may request, using a primary account, an indication of accounts of an organization that a data protection plan is applied to (e.g., the daily protection plan). In response to the request, the CAM service may obtain (e.g., based on the permission/authorizations assigned to the primary account), identifiers of the accounts that the data protection plan is applied to. The CAM service may then send, to the client (e.g., to a display of a management device), identifiers (e.g., names) of the different accounts that the data protection plan is applied to. Note that in embodiments, a local account administrator may not have the permissions/authorizations to view plans applied to other accounts and therefore would not be able to obtain them. As shown, a GUI 502 may display account names 504 and job status for jobs executing the backup plan for the account for all account using the backup plan. In embodiments, any other data associated with the accounts/backup plan may also be displayed.

FIG. 6 is an illustration of a displayed status of data protection jobs for different accounts of an organization, according to some embodiments.

In the depicted embodiment, a user/admin may request, using the primary account, a status of the respective jobs for accounts of an organization. In response to the request, the CAM service may obtain (e.g., based on the permission assigned to the primary account) the status of the respective jobs for the accounts. In embodiments, the status of the jobs may include status of the jobs scheduled from the primary account as well as status of other jobs scheduled by the other accounts themselves (e.g., scheduled by a local account administrator). In embodiments, the status of a given job may indicate completion of the job, execution of the job, or failure of the job. In embodiments, the status of a given job may indicate completion of the job, execution of the job, or failure of the job that occurred during a most recent time period (e.g., the last 30 days, the last hour, etc.).

Note that in embodiments, a local account administrator may not have the permissions/authorizations to view status of jobs of other accounts and therefore would not be able to obtain that information. As shown, a GUI 602 may display account names, job IDs, job status, backup plan name, resource type of the resources being backup up, and a job creation time. In embodiments, any other data associated with the jobs/backup plans may also be displayed.

Figure 7:
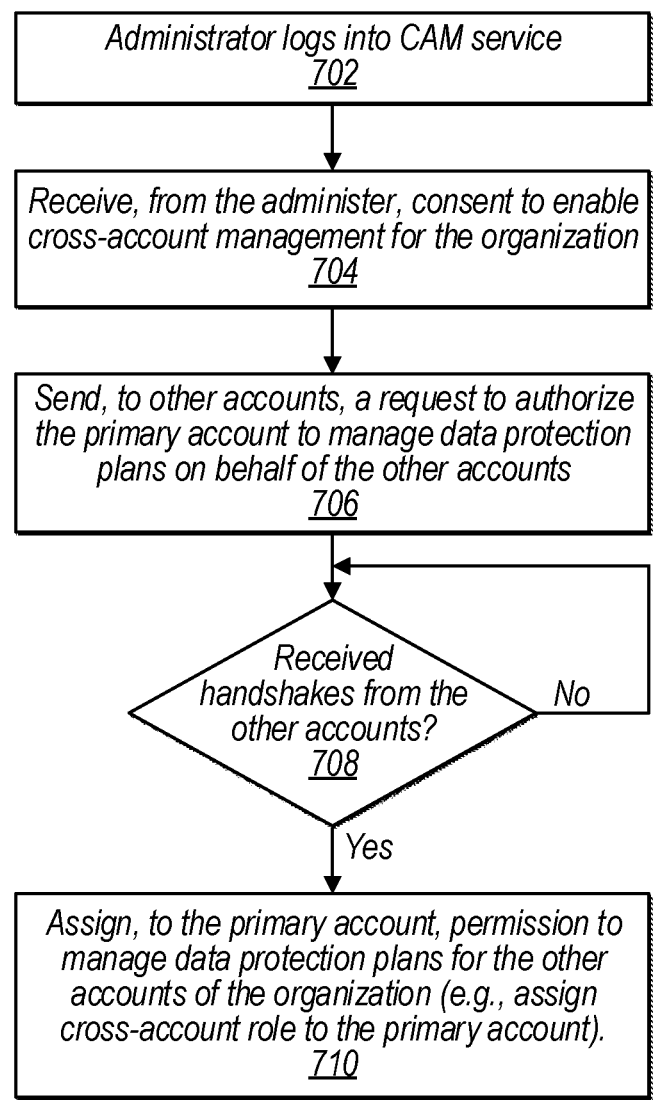
FIG. 7 is a high-level flowchart illustrating various methods and techniques to implement enabling cross-account management for a client organization, according to some embodiments.

FIG. 7 is a high-level flowchart illustrating various methods and techniques to implement enabling cross-account management for a client organization, according to some embodiments. These techniques, as well as the techniques discussed with regard to FIGS. 8-10, may be implemented using components or systems as described above with regard to FIGS. 1-6, as well as other types of components or systems, and thus the following discussion is not intended to be limiting as to the other types of systems that may implement the described techniques. For example, the techniques may be implemented by a CAM service of a provider network.

As indicated at block 702, an admin logs into a CAM service (e.g., as a super user). At block 704, the CAM service receives, from the administrator, consent to enable cross-account management for the organization of the client from the primary account. Based on the authorization of the administrator to consent to enable cross-account management for the organization from the primary account, the CAM service may assign the cross-account role to the primary account (in some embodiments, blocks 706-710 may be performed in order to assign the cross-account role to the primary account).

At block 706, the CAM service sends, to other accounts (e.g., to local account admins), a request to authorize the primary account to manage data protection plans on behalf of the account. At block 708, the CAM service determines whether handshakes have been received from all accounts (or from the particular accounts to be managed by the CAM service) of the organization. If not, then the process continues to check (e.g., periodically) to determine whether the handshakes have been received. If the CAM service determines that it has received handshakes from the other accounts, then at block 710, the CAM service assigns, to the primary account, the cross-account role to the primary account (e.g., assigning permission to manage data protection plans for the accounts). To do so, in some embodiments the CAM service may assign a cross-account role to the primary account.

Figure 8:
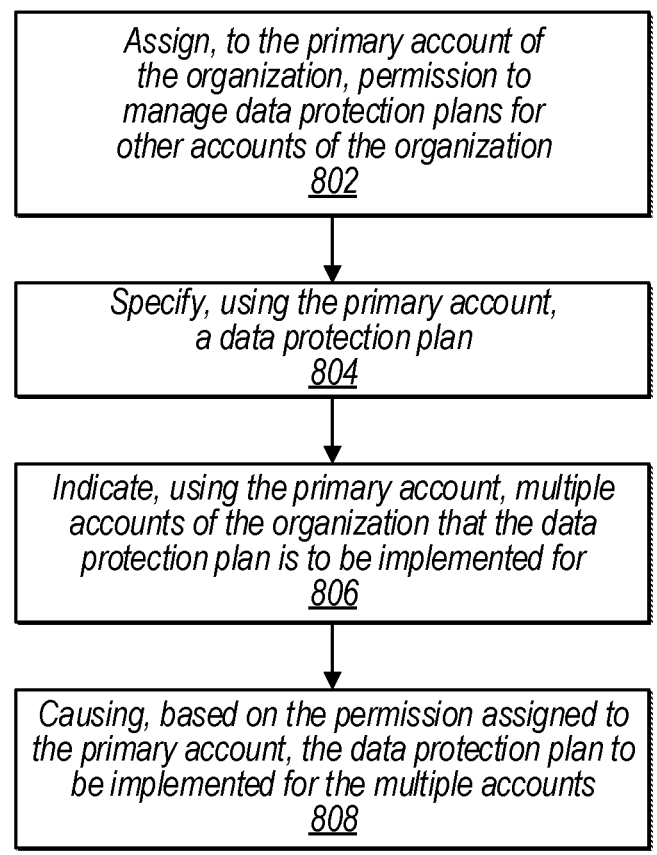
FIG. 8 is a high-level flowchart illustrating various methods and techniques to implement using a primary account to implement a data protection plan across accounts of an organization, according to some embodiments.

FIG. 8 is a high-level flowchart illustrating various methods and techniques to implement using a primary account to implement a data protection plan across accounts of an organization, according to some embodiments.

At block 802, the CAM service assigns, to a primary account of an organization of a client of the provider network, permission to manage data protection plans for other accounts of the organization. At block 804, the CAM service specifies, using the primary account, a data protection plan. At block 806, the CAM service indicates, using the primary account, multiple accounts of the organization that the data protection plan is to be implemented for. At block 808, the CAM service causes, based on the permission assigned to the primary account, the data protection plan to be implemented for the plurality of accounts.

Figure 9:
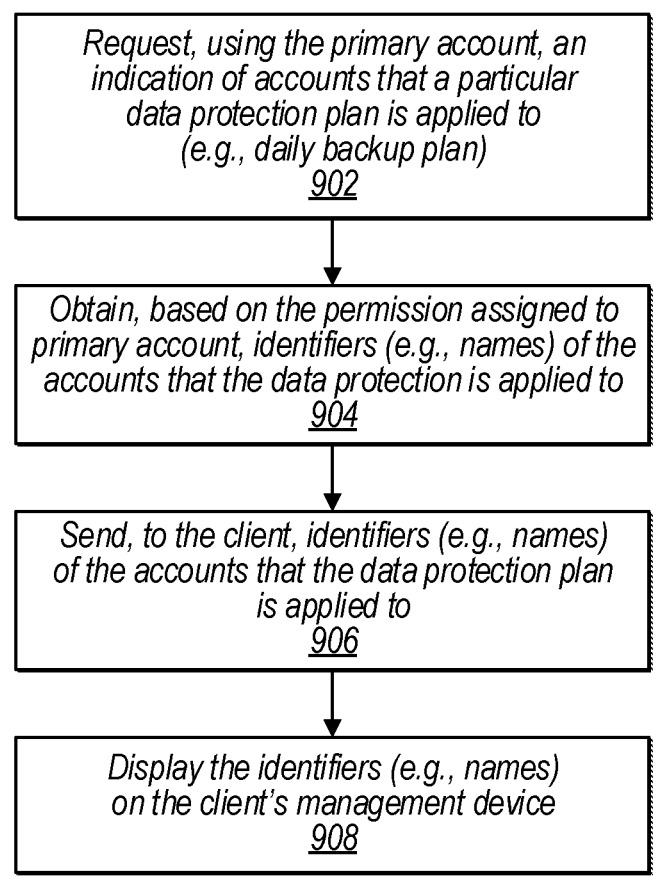
FIG. 9 is a high-level flowchart illustrating various methods and techniques to implement displaying a list of different accounts that a particular data protection plan is applied to, according to some embodiments.

FIG. 9 is a high-level flowchart illustrating various methods and techniques to implement displaying a list of different accounts that a particular data protection plan is applied to, according to some embodiments.

At block 902, the CAM service requests, using the primary account, an indication of accounts that the data protection plan is applied to. At block 904, in response to the request, the CAM service obtains, based on the permission assigned to the primary account, identifiers of the accounts that the data protection plan is applied to and sends (block 906), to the client, identifiers of the accounts. At block 908, a management device at a client network displays the identifiers.

Figure 10:
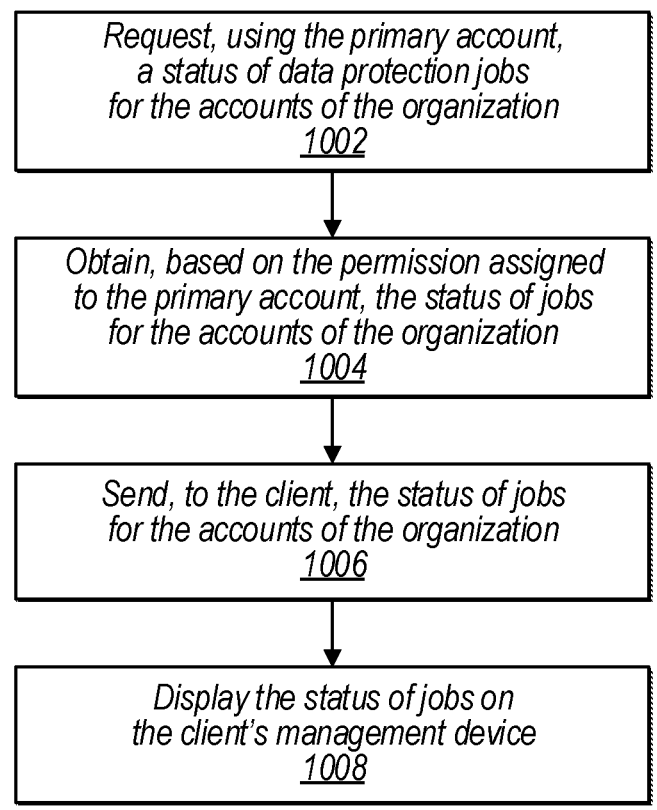
FIG. 10 is a high-level flowchart illustrating various methods and techniques to implement displaying status of data protection jobs for different accounts of an organization, according to some embodiments.

FIG. 10 is a high-level flowchart illustrating various methods and techniques to implement displaying status of data protection jobs for different accounts of an organization, according to some embodiments.

At block 1002, the CAM service requests, using the primary account, a status of data protection jobs for the accounts of an organization. At block 1004, in response to the request, the CAM service obtains, based on the permission assigned to the primary account, the status of the respective jobs for the accounts and sends (block 1006), to the client, the status of the respective jobs. At block 1008, a management device at a client network displays the status of the respective jobs.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of the CAM service and other components that implement the techniques described herein). The various methods as illustrated in the figures and described herein represent example embodiments of methods. The order of any method may be changed, and various elements may be added, reordered, combined, omitted, modified, etc.

Figure 11:
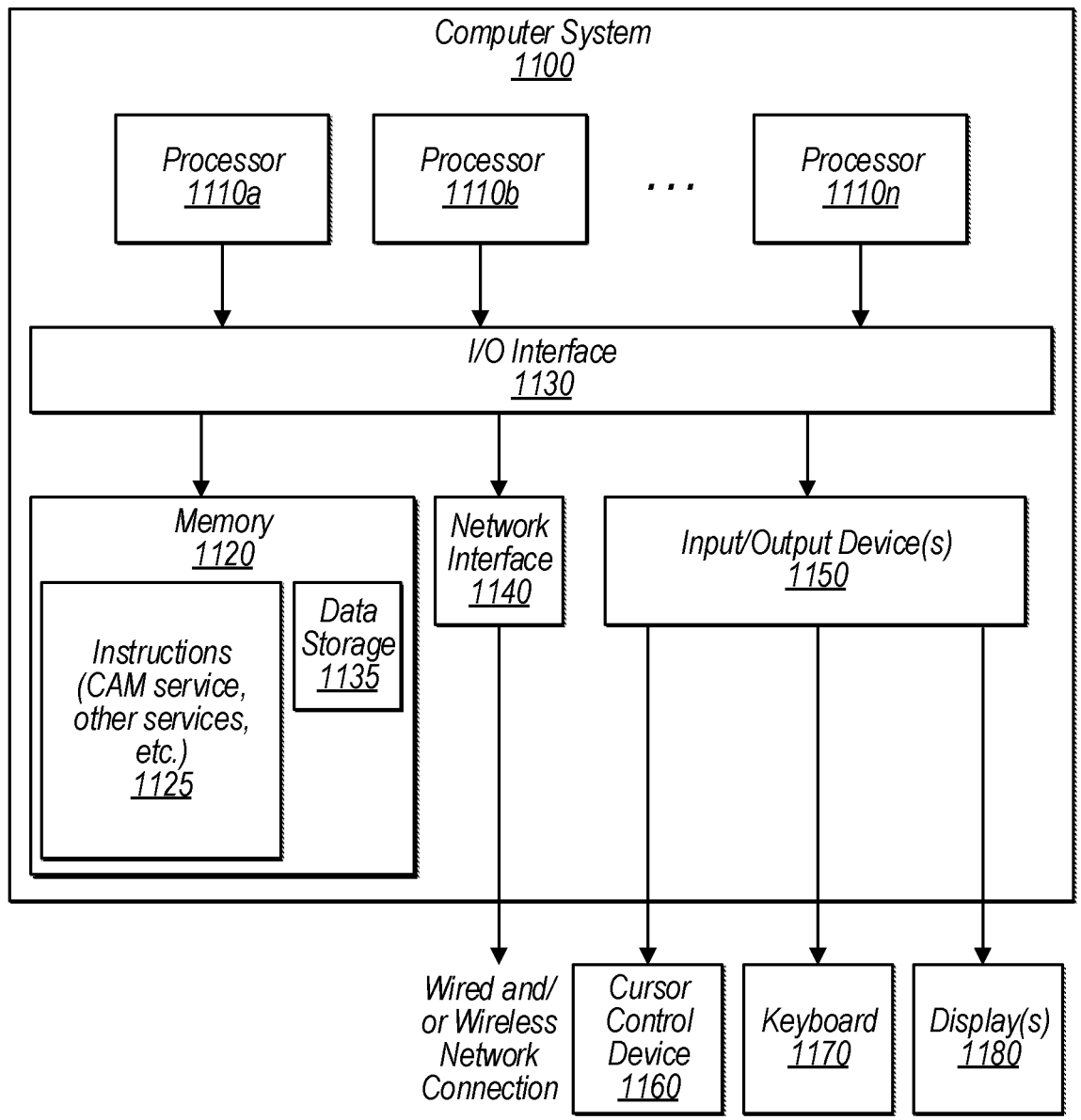
FIG. 11 is a block diagram illustrating an example computing system, according to some embodiments.

Embodiments to implement using a primary account to implement a data protection plan across accounts of an organization as described herein may be executed on one or more computer systems, which may interact with various other systems or devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the CAM service, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., data of resources to be backed up, data protection plans, accounts, organizations, roles, credentials, display data, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   one or more memories, wherein the one or more memories have stored thereon instructions, which when executed by the one or more processors, cause the one or more processors to implement a cross-account data management service (CAM service) for a plurality of clients of a provider network, wherein the CAM service is configured to, for a given client:
   assign a cross-account role to a primary account of an organization of the client, wherein the primary account is assigned permission, based on the cross-account role, to manage resource management plans for other accounts of the organization, and wherein the other accounts respectively enable permissions-based access to one or more resources of the account at the provider network, and wherein a given resource management plan implemented for a given account performs operations to manage data for at least one of the resources of the account;
   specify, using the primary account, a resource management plan;
   provide an indication, using the primary account, of a plurality of accounts of the organization that the resource management plan is to be implemented for, wherein the indicated plurality of accounts is a subset of the other accounts; and subsequent to the indication, using the primary account, of the plurality of accounts that the resource management plan is to be implemented for, cause by the CAM service, based on the permission assigned to the primary account by the CAM service of the provider network, execution of a plurality of jobs to implement the resource management plan for the plurality of accounts, wherein at least one service of a plurality of services of the provider network that implement resources for a first account of the plurality of accounts that data management operations are performed on to implement the resource management plan is not included in another plurality of services of the provider network that implement resources for a second account of the plurality of accounts that data management operations are performed on to implement the same resource management plan as for the first account.

2. The system as recited in claim 1, wherein the CAM service is configured to:
request, using the primary account, an indication of accounts that the resource management plan is applied to; and
in response to the request for an indication of accounts that the resource management plan is applied to:
obtain, based on the permission assigned to the primary account, identifiers of the plurality of accounts that the resource management plan is applied to; and
send, to the client, identifiers of the plurality of accounts that the resource management plan is applied to.

3. The system as recited in claim 1, wherein the CAM service is configured to:
request, using the primary account, a status of the respective jobs for the plurality of accounts; and
in response to the request for the status of the respective jobs for the plurality of accounts:
obtain, based on the permission assigned to the primary account, the status of the respective jobs for the plurality of accounts; and
send, to the client, the status of the respective jobs for the plurality of accounts.

4. The system as recited in claim 1, wherein to assign the cross-account role to the primary account, the CAM service is configured to:
receive, from an administrator of the client, consent to enable cross-account management for the organization from the primary account; and
based at least on authorization of the administrator to consent to enable cross-account management for the organization from the primary account, assign the cross-account role to the primary account.

5. The system as recited in claim 4, wherein to assign the cross-account role to the primary account, the CAM service is further configured to:
send, to the other accounts, a request to authorize the primary account to manage resource management plans for the other accounts; and
receive, from the other accounts, handshakes indicating that the primary account is authorized to implement resource management plans on behalf of the other accounts.

6. A method, comprising:
performing, by one or more computing devices of a provider network that implement a CAM service:
assigning, to a primary account of an organization of a client of the provider network, permission to manage resource management plans for other accounts of the organization, wherein the other accounts respectively enable permissions-based access to one or more resources of the account at the provider network, and wherein a given resource management plan implemented for a given account performs operations to manage data for at least one of the resources of the account;
specifying, using the primary account, a resource management plan;
providing an indication, using the primary account, of a plurality of accounts of the organization that the resource management plan is to be implemented for wherein the indicated plurality of accounts is a subset of the other accounts; and
subsequent to the indication, using the primary account, of the plurality of accounts that the resource management plan is to be implemented for, causing by the CAM service, based on the permission assigned to the primary account by the CAM service of the provider network, execution of a plurality of jobs to implement the resource management plan for the plurality of accounts, wherein at least one service of a plurality of services of the provider network that implement resources for a first account of the plurality of accounts that data management operations are performed on to implement the resource management plan is not included in another plurality of services of the provider network that implement resources for a second account of the plurality of accounts that data management operations are performed on to implement the same resource management plan as for the first account.

7. The method as recited in claim 6, further comprising:
requesting, using the primary account, an indication of accounts that the resource management plan is applied to; and
in response to the request:
obtaining, based on the permission assigned to the primary account, identifiers of the plurality of accounts that the resource management plan is applied to; and
sending, to the client, identifiers of the plurality of accounts.

8. The method as recited in claim 6, wherein causing, based on the permission assigned to the primary account, the resource management plan to be implemented for the plurality of accounts comprises:
scheduling the jobs to implement the resource management plan for the plurality of accounts; and
executing the jobs for the plurality of accounts according to the schedule.

9. The method as recited in claim 8, further comprising:
requesting, using the primary account, a status of jobs for the plurality of accounts; and
in response to the request:
obtaining, based on the permission assigned to the primary account, the status of jobs for the plurality of accounts, wherein the status of jobs includes status of the jobs scheduled from the primary account and status of other jobs scheduled by the other accounts, and wherein status of a given job indicates completion of the job, execution of the job, or failure of the job; and
sending, to the client, the status of the respective jobs.

10. The method as recited in claim 6, wherein the operations to manage data comprise backup operations that backup the data to a data store at the provider network, and wherein causing, based on the permission assigned to the primary account, the resource management plan to be implemented for the plurality of accounts comprises:
   causing the backup operations to be implemented for the plurality of accounts according to a predetermined frequency and according to a backup lifecycle.

11. The method as recited in claim 6, further comprising:
   specifying, using the primary account, another resource management plan;
   indicating, using the primary account, a different plurality of accounts of the organization that the other resource management plan is to be implemented for; and
   causing, based on the permission assigned to the primary account, the other resource management plan to be implemented for the different plurality of accounts.

12. The method as recited in claim 6, wherein indicating, using the primary account, a plurality of accounts of the organization that the resource management plan is to be implemented for comprises:
   indicating a group of the organization, wherein the plurality of accounts are assigned to the group, and wherein the organization is structured according to a hierarchy that includes the group and one or more other groups.

13. The method as recited in claim 6, wherein causing, based on the permission assigned to the primary account, the resource management plan to be implemented for the plurality of accounts comprises executing the jobs to implement the resource management plan for the plurality of accounts, and further comprising:
   requesting, by an administrator using a particular one of the plurality of accounts, a status of the jobs for the particular account, wherein the administrator using the particular account is unable to make changes to the resource management plan from the particular account, and wherein other accounts of the plurality of accounts are inaccessible to the administrator using the particular account; and
   in response to the request:
      obtain, based on permission assigned to the particular account, the status of the jobs for the particular account, wherein the status of other jobs of other accounts of the plurality of accounts is inaccessible to the particular account; and
      send, to the client, the status of the jobs for the particular account.

14. The method as recited in claim 6, further comprising:
   requesting, by an administrator using a particular one of the plurality of accounts, an indication of resource management plans that are applied to the particular account; and
   in response to the request:
      obtain, based on permission assigned to the particular account, identifiers of the resource management plans that are applied to the particular account, wherein other identifiers of other resource management plans that are applied to other accounts of the plurality of accounts are inaccessible to the particular account; and
      send, to the client, the identifiers of the resource management plans that are applied to the particular account.

15. One or more non-transitory computer-accessible storage media storing program instructions that when executed on or across one or more processors of a provider network cause the one or more processors to implement a CAM service to:
   assign, to a primary account of an organization of a client of the provider network, permission to manage resource management plans for other accounts of the organization, wherein the other accounts respectively enable permissions-based access to one or more resources of the account at the provider network, and wherein a given resource management plan implemented for a given account performs operations to manage data for at least one of the resources of the account;
   specify, using the primary account, a resource management plan;
   provide an indication, using the primary account, a plurality of accounts of the organization that the resource management plan is to be implemented for, wherein the indicated plurality of accounts is a subset of the other accounts; and
   subsequent to the indication, using the primary account, of the plurality of accounts that the resource management plan is to be implemented for, cause by the CAM service, based on the permission assigned to the primary account by the CAM service of the provider network, execution of a plurality of jobs to implement the resource management plan for the plurality of accounts,
   wherein at least one service of a plurality of services of the provider network that implement resources for a first account of the plurality of accounts that data management operations are performed on to implement the resource management plan is not included in another plurality of services of the provider network that implement resources for a second account of the plurality of accounts that data management operations are performed on to implement the same resource management plan as for the first account.

16. The one or more storage media as recited in claim 15, further comprising program instructions that when executed on or across the one or more processors cause the one or more processors to:
   request, using the primary account, an indication of accounts that the resource management plan is applied to; and
   in response to the request for an indication of accounts that the resource management plan is applied to:
      obtain, based on the permission assigned to the primary account, identifiers of the plurality of accounts that the resource management plan is applied to; and
      send, to the client, identifiers of the plurality of accounts that the resource management plan is applied to.

17. The one or more storage media as recited in claim 15, further comprising program instructions that when executed on or across the one or more processors cause the one or more processors to:
   request, using the primary account, a status of the respective jobs for the plurality of accounts; and
   in response to the request for the status of the respective jobs for the plurality of accounts:
      obtain, based on the permission assigned to the primary account, the status of the respective jobs for the plurality of accounts; and
      send, to the client, the status of the respective jobs for the plurality of accounts.

18. The one or more storage media as recited in claim 15, further comprising program instructions that when executed on or across the one or more processors cause the one or more processors to:
- specify, using the primary account, another resource management plan;
- indicate, using the primary account, a different plurality of accounts of the organization that the other resource management plan is to be implemented for; and
- cause, based on the permission assigned to the primary account, the other resource management plan to be implemented for the different plurality of accounts.

19. The one or more storage media as recited in claim 15, wherein to indicate, using the primary account, a plurality of accounts of the organization that the resource management plan is to be implemented for, the program instructions when executed on or across the one or more processors further cause the one or more processors to:
- indicating a group of the organization, wherein at least two or more of the plurality of accounts are assigned to the group, and wherein the organization is structured according to a hierarchy that includes the group.

20. The one or more storage media as recited in claim 19, wherein the program instructions when executed on or across the one or more processors further cause the one or more processors to:
- determine that a new account has joined the group; and
- in response to the determination that the new account has joined the group, cause, based on the permission assigned to the primary account, execution of jobs to implement the resource management plan for the new account.

* * * * *